March 25, 1952 C. H. O. BERG 2,590,148
LEVEL CONTROL
Filed Sept. 22, 1947 4 Sheets-Sheet 2

INVENTOR.
Clyde H. O. Berg
BY
Claude Swift
ATTORNEY

March 25, 1952 C. H. O. BERG 2,590,148
LEVEL CONTROL
Filed Sept. 22, 1947 4 Sheets-Sheet 3
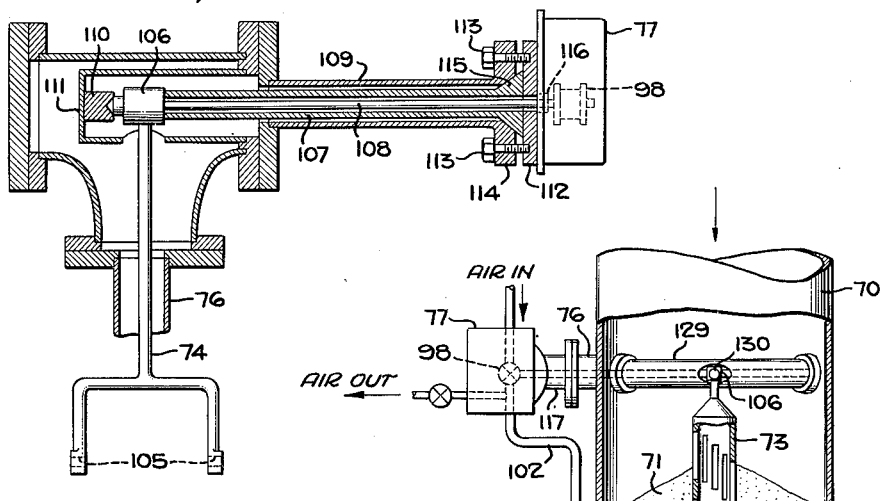
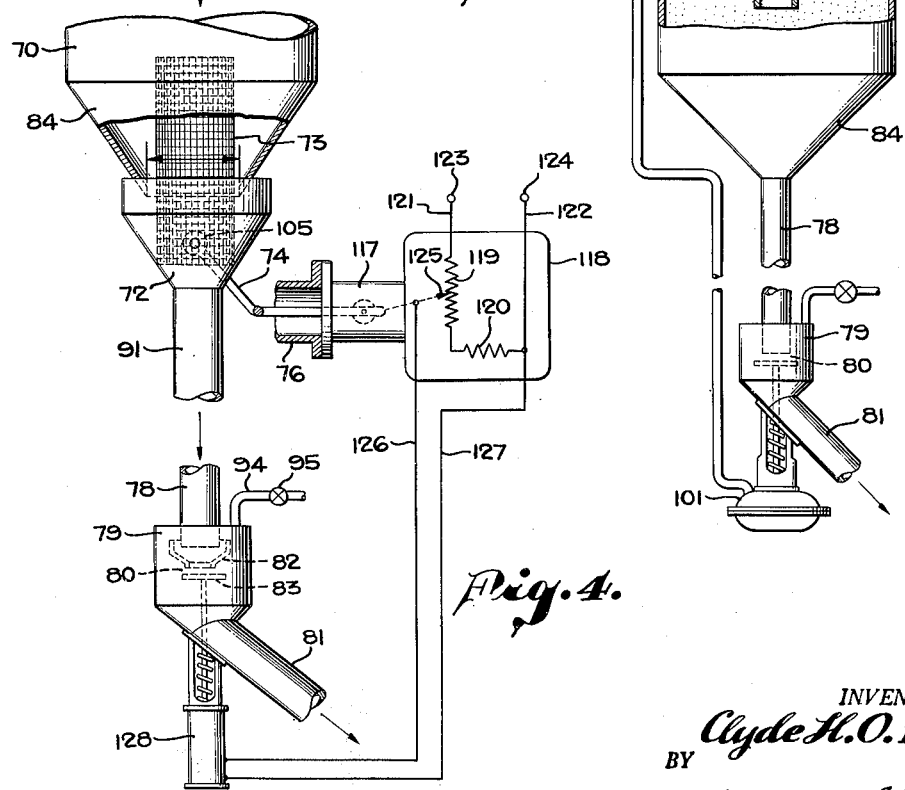
INVENTOR.
Clyde H. O. Berg
BY
Claude K. Swift
ATTORNEY March 25, 1952   C. H. O. BERG   2,590,148
LEVEL CONTROL
Filed Sept. 22, 1947   4 Sheets-Sheet 4
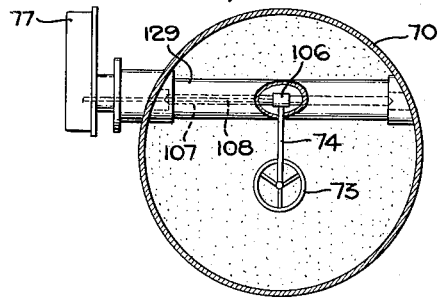
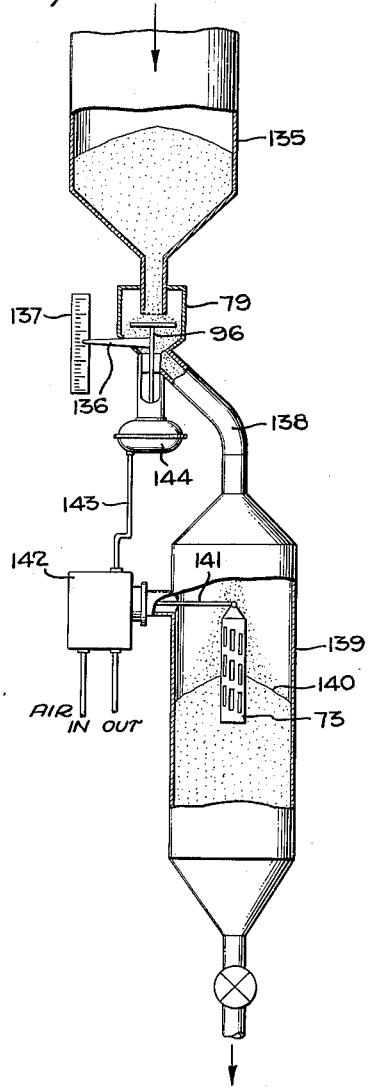
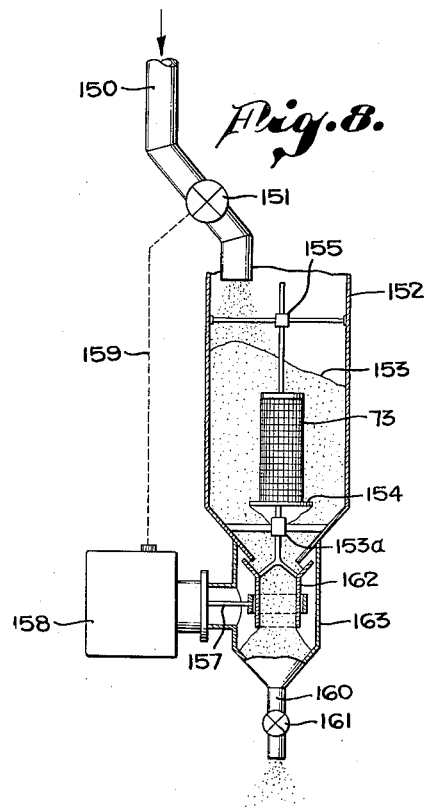
INVENTOR.
Clyde H. O. Berg
BY
Claude Elliott
ATTORNEY Patented Mar. 25, 1952

2,590,148

UNITED STATES PATENT OFFICE 2,590,148

LEVEL CONTROL

Clyde H. O. Berg, Long Beach, Calif., assignor to Union Oil Company of California, Los Angeles, Calif., a corporation of California Application September 22, 1947, Serial No. 775,554

23 Claims. (Cl. 183—4.2)

This invention relates to a mechanism for regulating and controlling the level of granular solids flowing through a vessel, whereby the level of such solids may be maintained at any desired point or the height of a column of said solids may be held constant within the vessel, which term includes sealing legs, pipes, tubes, etc. This invention further pertains to improvements in the separation of gaseous mixtures by selective adsorption wherein such mixtures may be resolved into a plurality of fractions and in particular applies to the use of the level control mechanism as hereinafter more fully described in conjunction with such a selective adsorption process.

The regulation of the levels of granular or powdered solids is of considerable importance in such processes as catalytic cracking, catalytic dehydrogenation, and other catalytic processes wherein solid granular catalysts are employed in moving beds or streams and in various other applications such as in selective adsorption processes where a moving bed of solid granular adsorbent is employed in the separation of gases or liquids. For example, in moving bed catalysts and moving bed adsorption operations the operation pressure is sometimes controlled within the vessel or contamination of a product gas prevented by a sealing leg at the top or bottom of a vessel through which is passed a continuous flow of a solid catalyst or adsorbent. The pressure within the vessel or the prevention of contamination of a particular product gas is maintained by the pressure drop resulting from a small flow of gas through such a sealing leg containing finely divided solids, thus the vessel is effectively sealed from the remainder of the system. The physical characteristics of such sealing legs for a particular application, that is, the length and diameter, etc. is a function of the particle size of the granular solids, the gas flow through the sealing leg, and the various pressure differentials between individual points of the system.

The maintenance of a constant height of a column of granular solids within a sealing leg or other vessel is highly desirable to permit a constant operation pressure for the production of a uniformly pure gas. This is particularly true in those instances in which a mechanism for controlling or metering the solids flow is employed within the vessel adjacent to or in conjunction with a sealing leg. For effective use of such a solids metering mechanism in conjunction with a sealing leg it is necessary that a free space be provided within the vessel directly below the metering mechanism or solids flow controller and simultaneously maintain a constant level of solids within the sealing leg. The present invention is directed to a device for controlling such solid levels as is applicable to systems wherein there is a flow of a solid stream of granular solids, including any and all granular or powdered materials which may be handled as a semifluid.

The invention finds particular application in selective adsorption processes wherein a gaseous mixture to be separated is flowed countercurrently to a granular solid adsorbent, such as charcoal, silica gel, alumina, or the like, in an adsorption column. It is known that certain solid adsorbents such as for example activated charcoal or silica gel will adsorb some gases such as water vapor, benzene vapor, butane, and the like, more readily than they will other gases such as hydrogen, nitrogen, methane, and the like, and that by heating the enriched adsorbent containing the adsorbed gases, these gases may be liberated substantially completely therefrom and the adsorbent after being cooled is capable of further selective adsorption. This has led to the development of various processes for the separation of gases involving adsorption on solid adsorbents, heating the enriched adsorbent to liberate the adsorbed gases and cooling the thus regenerated adsorbent for further use. Such adsorption processes are most effectively carried out by a countercurrent flow of the solid adsorbent and the gaseous mixture to be separated whereby the adsorbent flows through an adsorption zone, one or more rectification zones, a stripping zone, a cooling zone, and thence back to the adsorption zone. In general, these functions are carried out in one or more columns making it necessary to discharge the adsorbent from the bottom of one column to be reintroduced at the top of the same column or at the top of a second column which may contain, for example, the stripping zone. In either case it is necessary to effectively seal the column to prevent escape of gases therefrom or the leakage of gases into the column at the point of discharge of the solid adsorbent. This seal is most effectively accomplished by means of a sealing leg through which said adsorbent must flow maintaining therein a column of the adsorbent having a constant level at a height sufficient to induce a pressure drop therethrough of a magnitude calculated to limit to the desired extent the flow of gases either in or out of said adsorption column. The present invention is directed primarily to a means of controlling the level of the solid adsorbent in such sealing leg so as to maintain a continuous seal at the bottom of said adsorption column or columns, and in general to a means for controlling the level of any granular solids in a vessel, i. e., a means of maintaining a constant height or depth of flowing solid material.

It is a primary object of this invention to provide a mechanism which is well adapted to controlling the level or the height of a column of granular solids within a vessel through which solids flow.

It is a further object of this invention to provide a mechanism for solids level control wherein an effect of the position of the solids level is obtained which varies in a linear fashion with changes in the solids level.

It is another object of this invention to provide a means for the control of the quantity of granular solids in such vessels as sealing legs, transfer lines, etc. employed in catalytic, adsorption, and similar processes, whereby the pressure of operation and the product purity are directly affected.

It is a correlative object of the present invention to provide an improved process and apparatus for the separation of gaseous mixtures by continuous selective adsorption wherein the selective adsorption apparatus is provided with the hereinafter described level control mechanism which aids in maintaining a steady flow of granular adsorbent, effectively prevents contamination of the product gas containing more readily adsorbable constituents, and co-functions with the selective adsorption process as hereinafter more fully described to provide improved operation efficiencies.

Other objects and advantages of this invention will become apparent to those skilled in the art as the description thereof proceeds.

Briefly the level control of the present invention comprises the combination of a vertically movable means which is maintained in contact with the flowing powdered or granular solids passing through a particular vessel. This movable means may comprise a receptacle having the appearance of a funnel through which the solids may flow, or may comprise a plate or other structure adapted to be acted upon by the frictional and gravitational forces established by the flowing solids. The aforementioned receptacle may be substituted for a grid structure which may comprise a cylindrical mesh or perforated tube or other mechanical shape which is also adapted to be acted upon predominantly by the frictional forces and to a lesser extent by the gravitational forces exerted by the flowing solids. The movable means may further comprise a combination of the receptacle and the grid structure. The aforementioned movable means maintained in contact with the flowing solids may be supported by a suspension arm which provides a restoring force which only partly counteracts the frictional and gravitational forces on the movable means and thus the movable means is deflected from its mechanical equilibrium position. The magnitude of this deflection is a measure of the degree of change in the level or the height of a column of flowing granular solids. Such deflections are utilized according to the present invention to actuate an air or electrically operated controller which in turn operates a pneumatic, electric, or magnetic control valve. The control valve is adapted to vary the rate of flow of granular solids through the vessel in such a manner that the level or height of the column of solids returns to the desired position.

The movable means is supported in contact with the flowing granular solids by a suspension arm which may actuate a suitable controller through a system of levers which in turn operates the aforementioned control valve. In another modification the suspension arm supporting the movable means is connected at right angles to a torsional tube assembly so that the deflections of said movable means cause rotation of a part of the torsional tube assembly thereby adjusting part of the mechanism within the controller to vary the flow rate of the granular solids through adjustment of the flow control valve. It is preferable to employ the torsional tube assembly rather than a mechanical system of levers since the torsional tube assembly readily lends itself to this operation and requires a minimum of leak proof pressure seals.

The torsional tube assembly referred to previously consists of a hollow torsional tube which provides a restoring torque to the movable means when the latter is deflected downwardly under the action of a high solids level. An inner transmission shaft is positioned within the torsional tube and is rigidly affixed thereto at the point where the torsional tube assembly and the suspension arm, which latter supports the movable means previously mentioned, are joined together at right angles. The other end of the torsional tube is rigidly fixed in position while the inner transmission shaft is free to rotate through a bearing. Thus, should the level of solids rise to a height above the desired value, the receptacle and/or grid structure is deflected downwardly causing the suspension arm also to deflect downwardly through a small arc against the restoring torque of the torsional tube. A high degree of controller sensitivity is obtained because of grid structure giving a linear relationship between the level of granular solids and the deflection of the suspension arm. The transmission shaft, being rigidly attached at one end to the suspension arm and free to rotate through a bearing at the other, turns through the same arc as the suspension arm. The rotation of the transmission shaft may be employed, in one modification, to actuate an air valve in an air operated controller which may in turn operate a pneumatic control valve adapted to vary the rate of flow of granular solids. The air valve which comprises a part of an air operated controller may be so connected so as to close under the influence of a downward receptacle deflection and thereby effecting an increase in air pressure on a pneumatic solids control valve. The pneumatic control valve may be connected so as to open and permit an increased solids flow under the increased air pressure thereby causing the level of solids to drop and the receptacle to return upwardly to a more normal position.

The level control mechanism as just briefly described may be employed with electrically operated controllers and electrically or magnetically operated solids flow control valves instead of those which are air operated. The rotation of the transmission shaft previously described may be geared to suitably change a variable resistance or potentiometer and thus alter the quantity of electric power applied to an electrically or magnetically operated solids control valve. The operation of these modifications is virtually the same as that wherein the controller and control valves are air operated.

The elements of the present invention and its application to the control of the level of a granular adsorbent in the selective adsorption process may be more fully understood by reference to the accompanying drawings in which:

Figure 3 shows a plan view of a horizontal cross section of the suspension arm and torsional tube assembly of the level control mechanism.

Figure 1:
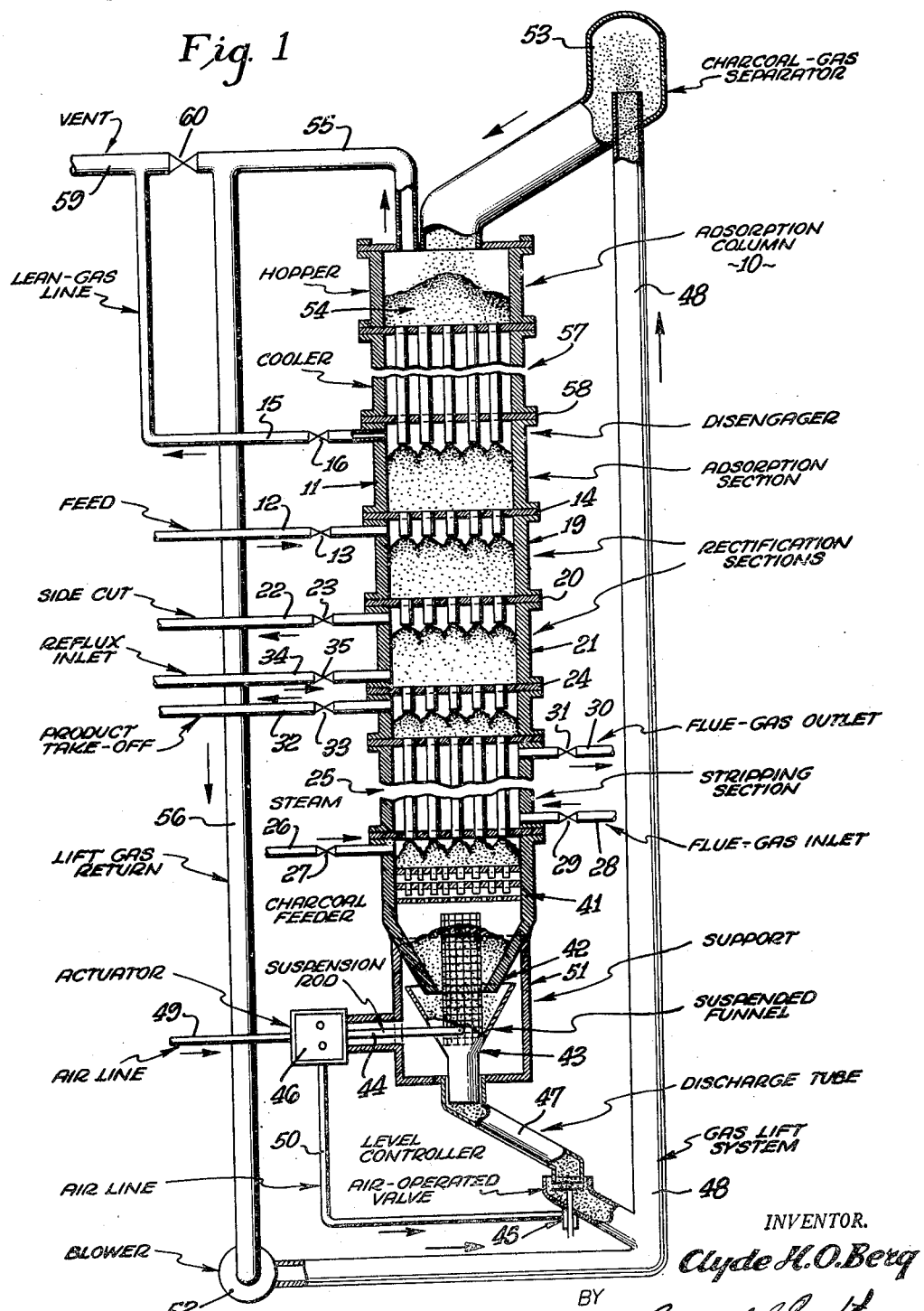
Figure 1 is a vertical cross section of an elevation view of a selective adsorption apparatus operating in conjunction with the solids level control mechanism as hereinafter more fully described.

Figure 4 shows a second modification of the grid structure, receptacle, and suspension arm of the level control mechanism operating in conjunction with an electrically operated controller and solids control valve, Figure 5 shows an elevation view of a vertical section of a third modification of the grid structure supported from above in absence of the receptacle by a suspension arm and torsional tube assembly operating in conjunction with an air operated controller and a pneumatic solids control valve, Figure 6 shows a plan view of a horizontal section of the equipment shown in Figure 5, Figure 7 shows an elevation view of the level controlled mechanism in which the movable means is suspended from above the level to be controlled and indicating and controlling the rate at which the granular solids are introduced into the vessel, and Figure 8 shows a vertical section of an elevation view of the level control mechanism in which the movable means is suspended from below the column of solids to be controlled and also varying the rate of introduction of solids into the vessel.

For purposes of convenience in illustration and to permit a more lucid description of the present invention the operation of the level control mechanism of the present invention will be described in connection with the selective adsorption process and apparatus operation in which a single adsorption column is employed. It is to be understood, however, that the level control mechanism of the present invention which is hereinafter more fully described is not intended to be limited or confined in its application to the selective adsorption process in which a single adsorption column is employed, but that the level control mechanism may likewise be employed without modification in selective adsorption processes in which two or more columns are employed wherein, for example, the adsorption zone may be contained within the first column and the desorption or stripping zone contained within the second. It is also to be understood that the level control mechanism is equally effective in the control of the level of solids employed in other processes besides that of selective adsorption such as catalytic cracking, dehydrogenation, and like processes and that the following description is presented in connection with the selective adsorption process in order to more clearly portray the method and advantages of the level control mechanism of the present invention.

The level control apparatus of the present invention is applicable to good advantage in the control of solids levels involved in the selective adsorption apparatus employed for the separation of normally gaseous mixtures. Briefly the selective adsorption process comprises the separation of gaseous mixtures by contacting such mixtures with quantities of a solid granular adsorbent in a moving bed wherein the more readily adsorbable constituents of the mixture are adsorbed leaving the less readily adsorbable constituents as a substantially unadsorbed gas. A solid bed of granular adsorbent flows downwardly through an adsorption column to countercurrently adsorb from the gaseous mixture the more readily adsorbable constituents thereby forming a rich adsorbent. In a lower portion of the column the rich adsorbent is heated and the adsorbed more readily adsorbable constituents are desorbed to form a rich gas.

Such an adsorption apparatus may be employed in the separation of a wide variety of gaseous mixtures on a suitable adsorbent which may include such adsorbents as activated charcoal, silica gel, activated bauxite, activated alumina, and the like. For purposes of description of the selective adsorption process in connection with Figure 1 it will be assumed that the gaseous mixture to be separated comprises methane and $C_2$, $C_3$ and $C_4$ paraffins and olefins which may or may not contain small amounts of gases of higher or lower molecular weight, and that the granular adsorbent employed comprises activated charcoal.

Referring more particularly to Figure 1, the gaseous mixture to be separated is introduced to adsorption zone 11 of adsorption column 10 by means of line 12 controlled by valve 13 and is distributed within the adsorption zone 11 by means of disengager 14. Disengager 14, as well as the other disengagers in the column may be any desired type such as for example a tube sheet with short tubes extending downwardly therefrom as shown in the drawing. A solid bed or granular charcoal flows downwardly by gravity through the adsorption column at such a rate in relation to the gaseous feed rate that substantially all of the $C_2$ and heavier hydrocarbons are adsorbed by the charcoal in adsorption zone 11 to form a rich charcoal while the methane and gases of lower normal boiling point which may be present in the feed pass upwardly through adsorption zone 11 and may be withdrawn therefrom by means of line 15 controlled by valve 16. The amount of lean gas withdrawn from adsorption zone 11 may be controlled so as to force the passage of a portion of the lean gas through the tubes of cooling zone 57 immediately above as hereinafter described.

The rich charcoal passes from adsorption zone 11 through disengager 14 into the rectification zone 19. Here the methane and lighter gases which may have been adsorbed are desorbed from the rich charcoal by contacting the rich charcoal with a side cut gas reflux containing $C_2$ hydrocarbons which are desorbed from the charcoal at a point lower in the column. Thus, in the rectification zone 19 any residual methane or lighter gases which may have been adsorbed by the charcoal passing downwardly through disengager 14 are desorbed by virtue of the selective adsorption exhibited by the charcoal for the $C_2$ hydrocarbons which are passed upwardly through disengager 20 into the rectification zone 19. The desorbed methane and lighter gases then flow upwardly countercurrent to the charcoal through disengager 14 and return to adsorption section 11.

The rectified charcoal thus formed is substantially free of such lighter components and passes from rectification zone 19 through disengager 20 into a second rectification zone 21. In second rectification zone 21, the rectified charcoal is contacted with a rich gas reflux containing heavier components in the feed, i. e., $C_3$ and $C_4$ hydrocarbons, to effect the desorption of the $C_2$ hydrocarbons from the rectified charcoal. The level of the $C_3$–$C_4$ reflux may be controlled at a given point within second rectification zone 21 by utilization of the temperature rise within that zone resulting from the heat of adsorption of the $C_3$ and $C_4$ hydrocarbons. By injecting, or otherwise introducing $C_3$ and $C_4$ hydrocarbons into the second rectification zone 21 to serve as reflux therein the $C_2$ hydrocarbons are desorbed due to the preferentially adsorption of the heavier hydrocarbons, and the $C_2$ hydrocarbons flow upwardly in the zone and a portion of the $C_2$ hydrocarbons may be removed from second rectification zone 21 by means of line 22 controlled by valve 23 as a side cut gas product. However, all of the $C_2$ hydrocarbons are not removed, a portion being passed upwardly through disengager 20 into rectification zone 19 to accomplish the double purpose of contacting the rich charcoal in rectification zone 19 with a side cut gas reflux to effect the desorption of the methane and lighter gases as above described, and at the same time to insure a continued retention of the charcoal flowing downwardly through disengager 20 of the heavier components of the feed so as to prevent any desorption of these heavier components in the upper portion of second rectification zone 21 inasmuch as such desorption would adversely effect the purity of the side cut gas product obtained. In this manner a side cut gas is obtained comprising a comparatively pure mixture of ethane and ethylene.

The charcoal, substantially free of the $C_2$ hydrocarbons and lighter gases, passes from second rectification zone 21 through disengager 24 into stripping zone 25. In stripping zone 25 the charcoal flows through the externally heated tubes and is contacted therein by steam flowing upwardly within the tubes countercurrent to the downward flow of charcoal. This steam is introduced at the lower portion of stripping zone 25 by means of line 26 controlled by valve 27. The tubes in stripping zone 25 through which the charcoal must flow are heated externally by means of flue gas, steam, organic compounds such as diphenyl or diphenyl oxide or mixtures thereof, or the like, which may be introduced to the zone by means of line 28 controlled by valve 29 and removed therefrom by means of line 30 controlled by valve 31. The steam passes counter-currently to the heated charcoal through the stripping tubes, strips the hydrocarbons from the charcoal and the steam and the hydrocarbons are removed from the column at disengager 24 by means of line 32 controlled by valve 33. At this point alternative methods of procedure may be followed: In one, a portion of the steam-hydrocarbon mixture may be passed upwardly through disengager 24 to act as reflux in second rectification zone 21, as described above, or all of the steam-hydrocarbon mixture may be removed by means of line 32, the hydrocarbon separated from the steam and reintroduced into the lower portion of second rectification zone 21 by means of line 34, controlled by valve 35. The charcoal passing through stripping zone 25 flows into the lower portion of the column at which point the rate of flow of the charcoal is most conveniently controlled. Any desired means of controlling this flow may be employed such as charcoal feeder 41 shown in the drawing, or the like. This charcoal passes through feeder 41 into the lower portion of the adsorption column from whence it flows into the level control apparatus of the present invention. The level of the charcoal is maintained at a constant position in the bottom of adsorption column 10 while continuously flowing downwardly through the level control mechanism.

The charcoal flowing through valve 45 enters the gas lift system 46 and is carried therein by means of gas stream furnished by blower 52 into the charcoal gas separator 53 and flows from this separator into hopper 54 at the top of the adsorption column. The gas employed in the gas lift system is removed from hopper 54 by means of line 55, the major portion thereof being returned by means of line 56 to the blower 52. The charcoal flows from hopper 54 through the cooling zone 57 and through disengager 58 into adsorption zone 11 to complete the cycle. The lean gas take-off valve 16 may be so controlled as to force a portion of the unadsorbed components of the feed to flow countercurrently to the charcoal through the cooling tubes in cooler 57 and may be removed from the top of the column by means of line 55, a portion of which may be vented by means of line 59 controlled by valve 60 or this lean gas may be used as make-up gas to the gas lift system in which case it is returned to blower 52 by means of line 56. This lean gas flow through cooler 57 serves to saturate the cooled lean charcoal with the constituents of the lean gas and also to remove traces of water which may be present on the charcoal.

The function of the level control mechanism, as hereinafter described in greater detail, is to aid in maintaining a steady and regular charcoal flow across the entire cross sectional area of adsorption column 10. It also prevents portions of the lift gas from entering the bottom of the adsorption column by maintaining a constant height of charcoal above valve 45 and effects a seal against an upward flow of lift gas.

Figure 2:
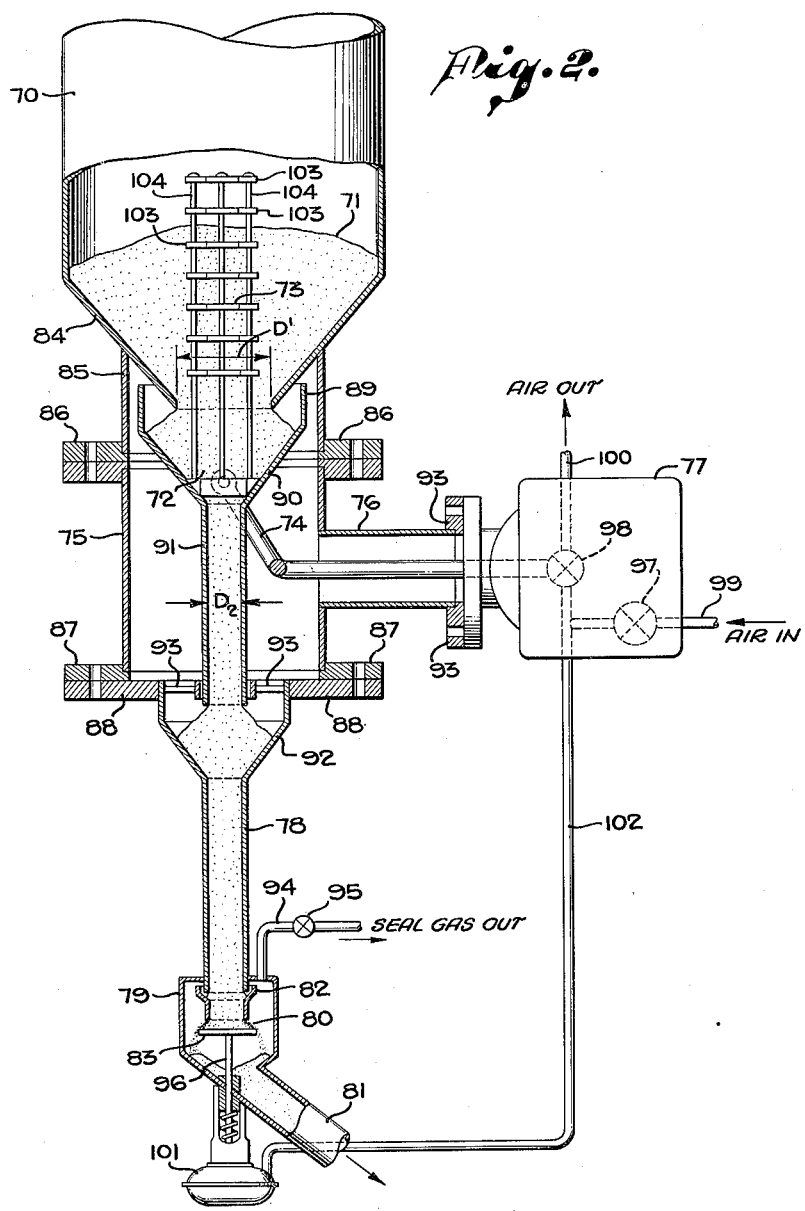
Figure 2 shows a vertical cross section of an elevation view of one modification of the grid structure, the receptacle, suspension arm, housings, controller and solids control valve of the level control mechanism.

Referring now more particularly to Figure 2, a solids level 71 is required to be maintained in the bottom of vessel 70. A continuous downward flow of granular solids passes through vessel 70 accumulating in the bottom and the level control mechanism of the present invention is employed to maintain solids level 71 in approximately the position shown in Figure 2. The essential elements of this modification of the level control mechanism include movable means comprising receptacle 72 and grid structure 73 which preferably extends upwardly from receptacle 72 through the bottom opening of vessel 70 to a height somewhat above solids level 71. The movable means is positioned along the vertical axis of vessel 70, supported in such a position by suspension arm 74 where it may be deflected by frictional and gravitational forces established by the flowing granular solids. Other elements of the level control mechanism include receptacle housing 75, suspension arm housing 76, air-operated controller 77, sealing leg 78, sealing gas disengaging zone 79, solids flow control valve 80, and transfer line 81. The granular solids flow downwardly from the bottom of vessel 70 as a dense phase, through and around grid structure 73, through receptacle 72 and sealing leg 78, and are discharged through the free space between the lower end of funnel 82 and valve plate 83. The degree of opening or of separation between the lower end of funnel 82 and valve plate 83 governs the rate of flow of solids downwardly from the lower portion of vessel 70. The granular solids are removed from seal gas disengaging zone 79 by means of transfer line 81 at a controlled flow rate.

Vessel 70 is provided with conical bottom section 84 having a bottom opening of diameter $D_1$. A cylindrical section 85 having a diameter greater than that of the bottom opening is directly attached along the same vertical axis to section 84. Cylindrical section 85 is provided with flange 86 by means of which receptacle housing 75 is attached. The lower portion of receptacle housing 75 is provided with flange 87 which permits rigid attachment of sealing leg 78 by means of flange 88.

Receptacle 72, which is suspended adjacent to and below the bottom opening of vessel 70, consists of upper cylindrical section 89, conical section 90, and lower cylindrical section 91 which latter is a minimum internal diameter $D_2$. It is desirable although not absolutely necessary that $D_1$ be somewhat larger than $D_2$.

Sealing leg 78 is provided at the upper portion thereof with funnel 92 to which is attached flange 88, flanges 87 and 88 being directly bolted together to form a rigid assembly. Funnel 92 is further provided with receptacle guides 93 adapted to maintain receptacle 72 in a stable position along the vertical axis of sealing leg 78 within receptacle housing 75 while permitting receptacle 72 to move freely along the vertical axis.

Suspension arm housing 76 is rigidly attached by means of flange 93 to the torsional tube assembly housing, not shown, and which will subsequently be more fully described in connection with Figure 3.

The lower portion of sealing leg 78 is provided with seal gas disengaging zone 79 as previously indicated. In order to prevent the contamination of gases present above solids level 71 with gases which may flow upwardly through transfer line 81 countercurrent to the downwardly flowing solids, seal gas line 94 controlled by valve 95 is provided to remove a seal gas from zone 79. Funnel 82 is provided within disengaging zone 79 and adjacent to and below the lower end of sealing leg 78 in order to disengage gases from the granular solid in sealing leg 78 so that any surges or other changes in gas flow rate will not adversely affect the solids flow rate through the opening between valve plate 83 and the bottom of funnel 82. Gases flowing downwardly through sealing leg 78 are disengaged from the solids in funnel 82 and are removed through the annular space between the upper end of funnel 82 and the lower end of sealing leg 78 and substantially no gas flow exists through the space between the lower end of funnel 82 and valve plate 83.

Solids flow control valve 80 may comprise, in the present modification, a spring loaded pneumatically operated diaphragm valve modified to the extent that valve plate 83 is directly attached to valve stem 96. In essence, air operated controller 77 comprises fixed valve 97 and variable valve 98 and is provided with air inlet line 99 and air outlet line 100. The degree of opening of variable valve 98 is changed by a vertical movement of receptacle 72. A continuous flow of air is maintained through inlet line 99, through fixed valve 97, through variable valve 98 and through outlet valve 100 and the pressure of the air entering line 99 is maintained at a constant value. Fixed valve 97 provides a restriction to the flow of air and during operation a variable pressure drop occurs across this restriction so that the magnitude of the air pressure transmitted from air operated controller 77 to diaphragm chamber 101 of solids control valve 80 by means of line 102 is a function of the setting of fixed valve 97 and of variable valve 98. For example, if solids level 71 rises above the desired value the force acting downwardly on grid structure 73 and upon receptacle 72 is increased and may be utilized in decreasing the opening of variable valve 98. This action increases the pressure drop maintained across variable valve 98, decreases the volume flow rate of air passing through both valves 97 and 98 therefore decreases the pressure drop existing across fixed valve 97 and as an end result increases the absolute pressure transmitted by means of line 102 to diaphragm chamber 101. The increase in pressure works against the spring loading of control valve 80 thereby causing an increased flow rate of solids which in turn causes solids level 71 to return to more nearly a normal or desired value. A valve positioner as often employed with pneumatically operated flow control valves may be employed to advantage in conjunction with solids flow control valve 80. A pulsation dampener, not shown, may be employed in conjunction with air operated controller 77 to eliminate surge effects caused by changes in air pressure and thereby improve the smooth solids flow and level control operation inherent in the mechanism shown in Figure 2.

The change in the downward force acting upon grid structure 73 is substantially a linear function of the change of position of solids level 71 with relation to grid structure 73 at a substantially constant solids flow rate. The absolute value of the change in downward acting force with respect to a unit change in position of solids level 71 may be varied somewhat by employing different modifications in the physical construction of grid structure 73. It has been found through experiment that the change in downward acting force in pounds per inch of variation in the height of the solids level may be calculated from the following equation:

$$\frac{dF}{dL} = \frac{\rho A}{864}$$

where $\rho$ is the density of the solids in pounds per cubic foot and $A$ is the cross sectional area in square inches of the grid structure calculated from the outside diameter of the grid structure. The validity of this relationship has been determined with such materials as synthetic bead cracking catalyst having an average bead diameter of about 0.2 inch and granular charcoal having a 12 to 20 mesh size.

Grid structure 73 shown in Figure 2 comprises a series of plates 103 having a diameter somewhat less than $D_1$ arranged parallel to and spaced equidistant from each other. The spacing distance may be about equal to the diameter of plates 103. A series of vertical tie rods 104 arranged in a circle and extending upward from conical section 90 of receptacle 72 to a position somewhat above solids level 71 is employed to maintain plates 103 in their proper position and support the grid structure as a whole. The centers of plates 103 are preferably removed leaving an annular ring which permits the solids to flow through and around grid structure 73.

Numerous other modifications of grid structure 73 may be employed such as for example a vertically positioned tube which may be provided with slots or holes through the wall thereof, or a cylindrical mesh disposed in a vertical position as is grid structure 73 and supported upon receptacle 72 are definitely operable. Such modifications of grid structure will subsequently be illustrated and described.

Referring now more particularly to Figure 3, a plan view of a horizontal cross section of the torsional tube assembly, suspension arm and housings is shown. Parts in Figure 3 which correspond to analogous parts described in connection with Figure 2 are indicated with the same numbers in Figure 3. Suspension arm 74, provided with trunnions 105, extends from receptacle housing 75, not shown, through suspension arm housing 76 and is joined at right angles with a torsional tube assembly by means of crank connection 106. The torsional tube assembly comprises torsional tube 107, transmission shaft 108 and torsional tube assembly housing 109. Crank connection 106 effects a rigid connection between suspension arm 74, torsional tube 107 and transmission shaft 108 so that when receptacle 72, not shown, is deflected downward, a turning moment is applied through suspension arm 74 to crank connection 106 which turns crank connection 106 through a small arc. The torsional tube assembly as shown is suspended along a horizontal axis at right angles to the axis of suspension arm 74 and is supported by bearing 110 which in turn is supported in bearing house 111. Attached to air operated controller 77 is base plate 112 provided with stud bolts 113 extending through plate 114. Torsional tube 107 is provided with flared end 115 adjacent to controller 77 and this end of torsional tube 107 is maintained in a fixed position so that it is unable to rotate by tightening stud bolts 113 thereby drawing plate 114 tightly up against flared end 115 and plate 112. Transmission shaft 108, however, which is rigidly attached to crank connection 106 extends through torsional tube 107 through bearing 116 and extends into controller 77. Transmission shaft 108 is free to rotate through the same arc as suspension arm 74 and the movement of the free end of transmission shaft 107 which extends into controller 77 through bearing 116 is employed to open or close variable valve 98 or to vary the resistance of a suitable resistor in the case that controller 77 be electrically operated. The action of this torsional tube assembly basically resembles the movement of an electrical meter wherein torsional tube 107 corresponds to the hair spring which applies a restoring torque to the needle indicator of the meter. The needle in this electrical meter analogy corresponds to transmission shaft 108.

One of the principal advantages realized by employing a torsional tube assembly just described is that it is a completely gas tight mechanism and is easily fabricated from conventional materials of construction. No gas tight seals are required around movable shafts by virtue of the fact that torsional tube 107 and transmission shaft 108 are rigidly attached, for example, welded to crank connection 106.

The modification of the torsional tube assembly just described in connection with Figure 3 is adapted by the nature of its construction to be positioned on the outside of vessels in which a level of granular solids is to be maintained. It is possible by somewhat altering the position of crank connection 106 with respect to torsional tube 107 and transmission shaft 108 to obtain a modified torsional tube assembly which is readily adaptable to be positioned within a vessel in which a solids level is to be maintained. This modification will be more clearly described in connection with Figure 5.

Figure 4 illustrates a modification of the level control mechanism of the present invention which is adapted to control a variable solids level by means of an electrically operated controller and an electrically or magnetically operated solids flow control valve. In Figure 4 portions of the apparatus which are also shown in Figure 2 are indicated in Figure 4 with the same numbers. Figure 4 shows the lower portion of vessel 70 and shows conical bottom section 84 but does not show cylindrical section 85 with flanges 86 or receptacle housing 75. Grid structure 73 is shown as a cylindrical mesh such as a screen rolled into the form of a cylinder which is supported in a position so that it has the same vertical axis as receptacle 72. The mesh size of grid structure 73 should be sufficient to permit a substantially unimpaired flow of solids being handled through structure 73. The lower portion of lower cylindrical section 91 as well as the upper portion of sealing leg 78 have been omitted for the sake of clarity. Sealing gas disengaging zone 79 provided with seal gas outlet line 94 controlled by valve 95 is shown as well as transfer line 81. Receptacle 72 is supported through trunnions 105 by means of suspension arm 74 shown extending through suspension arm housing 115 into controller housing 117. Positioned within electrically operated controller 118 and connected in series are potentiometer or variable resistance 119 and fixed resistance 120. These resistances in series are connected by means of lines 121 and 122 to contacts 123 and 124 which in turn are connected to a source of power such as, for example, a 110 volt A. C. supply. An upward or downward motion of receptacle 72 and grid structure 73 causes suspension arm 74 to rotate through an arc and by means of the torsional tube assembly which has been more fully described in connection with Figure 3 causes movable contact 125 to move along variable resistance 119. With a constant applied voltage between contacts 123 and 124, the voltage differential between contact 124 and movable contact 125 will vary in accordance with the position of the solids level. This varying voltage differential is applied by means of lines 126 and 127 to solenoid 128 of solids flow control valve 80 thereby increasing or decreasing the opening between funnel 82 and valve plate 83. This variation causes the solids flow rate to change suitably so that the solids level desired in vessel 70 is maintained in the desired position. Thus the opening of solids flow control valve 80 may be varied in accordance with the height of the solids level by means of electrically operated apparatus as well as the air operating variety.

Referring now more particularly to Figure 5 there is shown a modification of the solids level control mechanism which is adapted to control a solids level within a vessel by means of a mechanism similar to that previously described but which is not provided with the receptacle refered to previously and in which the grid structure is suspended from above instead of below. In Figure 5 is shown vessel 70 in which a solids level 71 is desired to be maintained at the position shown. The solids flow downwardly from the bed below level 71 through conical bottom section 84, through a sealing leg 78, through a seal gas disengaging zone 79, through a solids flow control valve 80, and are removed by means of transfer line 81 in a similar manner as described in connection with Figure 2. Parts of the apparatus shown in Figure 5 which are similar to those shown in Figure 2 are indicated with the same numbers. A modification of grid structure 73 is shown in Figure 5 and which comprises a tube which may be provided with perforations or slots. The tube is arranged in a vertical position along a vertical axis. It is possible to position grid structure 73 in substantially any vertical position within vessel 70 as well as along the vertical axis of vessel 70. However, it is desirable that the grid structure be centrally located so that the upper portion of grid structure 73 is above solids level 71 and that structure 73 extends downwardy a substantial distance below solids level 71. An internal torsional tube assembly housing 129 is shown extending across from one side of vessel 70 to the other, but displaced from the diameter of the vessel. Torsional tube assembly comprises the torsional tube and inner transmission shaft not shown in this figure but extends along the same horizontal axis within internal torsional tube assembly housing 129 and in the same relationship to each other as indicated in Figure 3. A crank connection 106 is maintained at the approximate center of the torsional tube assembly to which the suspension arm is connected at right angles and extends outwardly therefrom in a horizontal plane toward the center of vessel 70. An end view of suspension arm is shown as 130 in Figure 5. Grid structure 73 comprising a slotted or perforated tube or any of the other modified grid structures previously described is suspended downwardly from the near end 130 of the suspension arm. The slots or perforations, when used, should have a minimum dimension which is sufficient to permit a substantially unimpeded flow of solids therethrough. As previously described, the torisional tube is rigidly fixed in position at crank connection 106 and at each end of torsional tube assembly housing 129. However, one end of the inner transmission shaft as before is free to rotate through the same arc as the suspension arm, while the other end is fixed in position. The inner transmission shaft extends outwardly through the wall of vessel 70, through suspension arm housing 76, through controller housing 117 into air operated controller 77. This controller may just as conveniently comprise an electrically operated controller similar to that described in connection with Figure 4. The rotation of the inner transmission shaft serves to change the opening of variable air valve 98 thereby changing the air pressure transmitted to diaphragm chamber 101 by means of line 102. Changes in air pressure thus introduced to diaphragm chamber 101 change the degree of opening of solids flow control valve 80 thereby allowing level 71 of solids flowing through the system to more nearly approach the desired value by changing the rate of flow of solids removed from the system by means of transfer line 81.

Referring now more particularly to Figure 6 a plan view of the modification of solids level control mechanism shown in Figure 5 is depicted. Grid structure 73 which comprises a movable means in this modification is shown suspended by suspension arm 74 which is rigidly attached to the torsional tube assembly positioned within assembly housing 129 by crank connection 106. The torsional tube assembly includes torsional tube 107 and inner transmission shaft 108 as described and shown in Figure 3. Inner transmission shaft extends into controller 77 wherein it varies the opening of an air valve, not shown, which in turn actuates a pneumatic control valve also not shown, which is adapted to vary the rate of flow of granular solids passing downwardly through vessel 70 in accordance with the position of the solids level in vessel 70 or in accordance with the height of a solids level above a certain point in the system as described in conjunction with previous figures. Comparison of the plan view of Figure 6 and the elevation view of Figure 5 gives a clear description of this modification of the level control mechanism.

Referring now more particularly to Figure 7, an additional modification of the level control mechanism is shown in which the movable means maintained in contact with the flowing solids is supported from above the level of solids to be controlled and serves to actuate a controller which in turn varies the flow rate of solids introduced into the vessel wherein the level is desired to be maintained. Granular solids flow from hopper 135 downwardly through solids flow control valve 79 herein adapted to control the inlet solids flow rate. In this modification of level control mechanism valve stem 96 is provided with an indicator 136 and scale 137 which serves to indicate the degree of opening of solids level control valve 144 and correspondingly the rate of flow of granular solids passing therethrough. The granular solids flow downwardly through conduit 138 and enter vessel 139 wherein a solids level 140 is desired to be maintained at a constant height above the bottom of the vessel. Movable means or grid structure 73 comprises in this modification a vertically positioned perforated tube suspended from above by means of lever 141 which extends into air operated controller 142. The inner workings of controller 142 may comprise a mechanism similar to the electrical mechanism described in connection with electrically operated controller 118 of Figure 4 or air-operated controller 77 of Figure 2 or Figure 5. The frictional and gravitational forces exerted on movable means 73 are transmitted through lever 141 into controller 142 wherein a variation in air pressure is made through line 143 into the diaphragm chamber of pneumatically operated control valve 144 thus varying the rate of flow of granular solids downwardly through conduit 138 into vessel 139. An electrically operated controller and control valve may be substituted for the air-operated mechanism shown in the present figure. If desirable a torsional tube assembly may be employed instead of suspension arm and lever 141. The modification of level control mechanism shown in Figure 7 is one in which movable means is supported from above the level to be controlled and the rate of granular solids entering the system rather than leaving the system is controlled.

Referring now more particularly to Figure 8, a modification of the level control mechanism is shown in which the movable means is supported from below and the rate of introduction of granular solids is controlled. Granular solids are introduced by means of line 150 and pass through solids control valve 151 for introduction at a controlled flow rate into vessel 152 establishing a solids level 153. Movable means in this modification comprises grid structure 73, supported on plate 154 and provided with guides 155 and 153a to assure a smooth vertical deflection. The downwardly acting frictional and gravitational forces established by the flowing solids is transmitted through receptacle 162 maintained within receptacle housing 163 and subsequently through suspension arm 157 into controller 158. The degree of deflection of the movable means actuates controller 158 so that an adjustment is made through line 159 in the degree of opening the solids flow control valve 151. Granular solids, thus controlled, flow downwardly through vessel 152 through and around movable means which comprises grid structure 73, plate 154, and receptacle 162, and continues downwardly through receptacle housing 163 through line 160 controlled by restriction 161 which may comprise an orifice thus providing a constant rate of granular solids discharge.

The various modifications of torsional tube assemblies, grid structures, electrically or air operated controllers and solids control valves may be used interchangeably with all of the modifications of the level control mechanism herein described. For example, the modification of receptacle and grid structure shown in Figure 1 is applicable for use with the torsional tube assembly shown in Figure 3 or the internal torsional tube assembly described in connection with Figure 5 wherein the grid structure is suspended from above without the receptacle. Electrically or air-operated controllers and solids flow control valves may be used interchangeably with various types of torsional tube assembly and grid structure. Each of these modifications of level control mechanism is well suited with the flow and level control of substantially any powdered or granulated solid material which may be handled as a semifluid. For example, such solids as granular sugar, sand or gravel, granulated chemicals or other crystalline matter and other such masses of solid particles. The foregoing illustrations and descriptions thereof have therefore not been intended to be limited in particular combinations of elements shown in the particular figure but rather to show a series of modifications of an apparatus well adapted to the accurate control of a solid level in a conduit, vessel, transfer line, or the like. Furthermore, the description or the usage of the level control mechanism herein described with the selective adsorption process is likewise not intended to serve as or define any limitations to the usage of the level control mechanism for the operations and function of the level control mechanism is independent of the particular nature of the process in which granulated solids are employed or the characteristics of the particular granulated solids used.

Many modifications in the operation and in the design of the adsorption unit may be employed without departing from the present invention which comprises the usage of a new and improved type level control in conjunction with the selective adsorption process. For example, it may be desirable to divide the operation, separating the processes of adsorption and stripping into two separate columns wherein, as in the above described example, the heart cut would be obtained in the initial column by introducing the heavier components obtained in the stripping column as reflux to effect the desorption of the intermediate components. In another modification an elevator type charcoal conveyance may be employed in place of the gas lift system as described. In such case the charcoal flowing through the control valve 45 would be deposited in a bucket conveyer and carried directly to the top of the column of if a two-column operation were employed the enriched charcoal flowing from the lower portion of the adsorption column would be transferred by an elevator to the top of the stripping column and the charcoal flowing from the lower portion of the stripping column would be conveyed by means of an elevator to the top of the adsorption column. It should be emphasized that if a two-column operation is employed it is highly desirable to employ a level control as herein described at the bottom of each of the columns so as to maintain a constant level therein.

Wherein the adsorption process is described with reference to a modified procedure wherein the heart cut is obtained from the gaseous feed it is to be understood that the present invention, pertaining to an improved method and apparatus for the control of the level of granular solids and for the usage of such apparatus in conjunction with the adsorption process, is equally effective when this process involves solely the adsorption of certain components from a gaseous mixture followed only by the subsequent recovery of the adsorbed components from the adsorbent by steam stripping or the like. Whereas, I do not intend to be limited to charcoal adsorption, charcoal is the preferred adsorbent particularly to the separation of hydrocarbon gases. The charcoal employed in the above process is preferably granular, about 10 to 20 mesh, although sizes as much as about 4 mesh and as small as about 100 mesh may also be employed. The term charcoal used herein is meant to include any animal, vegetable, or mineral charcoal, or the like, although an activated form of vegetable carbon or charcoal prepared from coconut hulls or fruit pits is preferred. After long usage small amounts of highly adsorbable material may accumulate on the charcoal and hamper its efficiency in which case the charcoal may be withdrawn from the column and may be reactivated by a high temperature steam treatment.

Whereas, particular emphasis has been placed upon the usage of the improved level control in conjunction with the charcoal adsorption process, it should be apparent to those skilled in the art that this level control will find application in any process or in any usage in which granular solids are passed from a vessel and at the same time are employed to prevent ingress or egress of gases to or from this vessel. Such a situation may occur, for example, not only in selective adsorption process as described, but in many catalytic processes such as cracking, dehydrogenation, and the like, as well as in various treating processes, etc. It is therefore, within the scope of this invention to employ a level control as described in any operation in which the function thereof is of importance or is required.

Having described and illustrated my invention with respect to the principal elements thereof and its usage in conjunction with adsorption of other processes in which granular solids are employed and realizing that many modifications thereof will occur to those skilled in the art without departing from the spirit or scope of the foregoing description and the following claims.

I claim:

1. An apparatus for maintaining a column of flowing granular solids at a constant height which comprises movable vertical grid means maintained in contact with said flowing solids and a solids flow control valve, said movable grid means being cylindrical in shape and having perforations sufficient to permit a substantially unimpeded flow of solids therethrough and thereby permit said movable grid means to be acted upon by the frictional and gravitational forces established by said flowing granular solids so as to cause a deflection of said movable grid means in accordance with the varying height of said solids, and said solids control valve adapted to vary the rate of flow of said granular solids in accordance with said deflection.

2. An apparatus for maintaining a column of flowing granular solids at a constant height which comprises in combination a movable vertical grid means in contact with said solids, a controller, and a solids flow control valve, said movable grid means being cylindrical in shape and having perforations sufficient to permit a substantially unimpeded flow of solids therethrough and thereby permit said movable grid means to be deflected by frictional and gravitational forces established by said flowing solids in accordance with the height thereof, said controller adapted to be actuated by said deflection of said movable grid means and said controller being also adapted to actuate said solids flow control valve to vary the rate of flow of said granular solids.

3. An apparatus for controlling the level of granular solids at a fixed point above a discharge control valve which comprises in combination a vertically movable vertical grid structure disposed adjacent to the level to be controlled, said movable grid being cylindrical in shape and having perforations sufficient to permit a substantially unimpeded flow of solids therethrough, a suspension arm supporting said grid structure, a torsional tube assembly attached to said suspension arm, and a controller adapted to adjust said control valve and thus vary the flow rate of said granular solids in accordance with the level of said solids.

4. An apparatus according to claim 3 wherein said grid structure extends through the level of solids to be controlled.

5. An apparatus according to claim 3 wherein said grid structure is supported by said suspension arm from above the level of solids to be controlled.

6. An apparatus according to claim 3 wherein said grid structure is supported through said suspension arm from below the level of solids to be controlled.

7. An apparatus according to claim 3 wherein said controller and said control valve are air operated.

8. An apparatus according to claim 3 wherein said controller and said control valve are electrically operated.

9. An apparatus for controlling a level of granular solids in vessels which comprises in combination a vessel provided with means for the introduction of granular solids substantially above the bottom thereof, a bottom opening through which said granular solids are discharged, a vertically elongated and vertically movable grid structure extending upwardly through the bottom opening of said vessel and extending through said level of solids to be controlled, said grid structure resting on a vertically movable receptacle which has a minimum diameter less than the diameter of the bottom opening of the vessel, and is supported below said solids level to be controlled, a suspension arm supporting said receptacle, a torsional tube assembly attached at right angles to said suspension arm, an air-operated controller and an air-operated control valve adapted to vary the rate at which said solids are discharged through said bottom opening of said vessel in accordance with the level of said solids.

10. An apparatus according to claim 9 wherein said solids are continuously introduced into said inlet of said vessel and are continuously discharged through said bottom opening of said vessel, said solids continuously flowing downwardly through and around said grid structure and continuously downwardly through said receptacle.

11. An apparatus for circulating a moving bed of granular solids through a column containing gas under pressure without permitting excessive flow of gas with the solids removed from said column, which comprises an elongated sealing leg below said column and communicating therewith, a solids control valve at the bottom of said sealing leg, means for recirculating solids withdrawn from said column through said control valve to the top of said column, a solids feeder near the lower end of said column adapted to support a continuous bed of said solids thereabove and discharge them into a free space in the lower portion of said column, and means for automatically maintaining a moving bed of solids in said sealing leg with a solids level in said free space, said last named means comprising the combination of a vertically elongated and vertically movable grid structure extending through said solids level in said free space, a suspension arm supporting said grid structure, a torsional tube assembly rigidly attached at right angles to said suspension arm, a controller attached to said torsional tube assembly, said controller being adapted to operate said control valve when actuated by said torsional tube assembly so as to vary the flow rate of granular solids through said sealing leg in accordance with said solids level.

12. An apparatus according to claim 11 wherein said grid structure is supported from above said solids level by said suspension arm, and wherein said suspension arm and said torsional tube assembly are positioned within said free space in said column.

13. An apparatus according to claim 11 wherein said vertically movable grid structure is supported by a suspension arm positioned below said solids level wherein said solids flow downwardly through and around said grid structure.

14. An apparatus according to claim 11 in which said torsional tube assembly comprises a hollow torsional tube rigidly attached to said suspension arm at one end and rigidly attached to said column at the other, and an inner transmission shaft rigidly attached to said suspension arm at one end and free to rotate at the other.

15. An apparatus according to claim 11 wherein said grid structure is supported on a receptacle adapted to receive solids discharged from the bottom of said column and in turn discharge said solids into the top of said sealing leg, said receptacle comprising an upper conical section and a lower cylindrical section thereby having the appearance of a funnel.

16. An apparatus for the separation of a gaseous mixture by continuous selective adsorption on a solid granular adsorbent comprising an adsorption column provided with an adsorption zone in the upper portion thereof, a stripping zone in the lower portion thereof, means for introducing said gaseous mixture into the lower portion of said adsorption zone, means for removing the unadsorbed constituents of said gaseous mixture from the upper portion of said adsorption zone, means for introducing stripping gas into the lower portion of said stripping zone, means for removing stripping gas and adsorbed constituents of said gaseous mixture from the upper portion of said stripping zone, an elongated sealing leg below said column and communicating therewith, a solids control valve for controlling the withdrawal of said granular adsorbent from the bottom of said sealing leg, means for conveying said granular adsorbent withdrawn from the bottom of said sealing leg to the top of said adsorption column, a solids feeder near the lower end of said adsorption column below said stripping zone, said solids feeder being adapted to support a continuous bed of said solids throughout said adsorption zone and stripping zone thereabove and to discharge solids at a controlled rate into a free space in the bottom of said column, and means for automatically maintaining a moving bed of solids in said sealing leg and controlling the level of said granular adsorbent in the free space in the bottom of said adsorption column, said last-named means comprising in combination a vertically elongated and vertically movable grid structure through and around which said granular adsorbent passes, a suspension arm supporting said grid structure, a torsional tube assembly adapted to provide a restoring torque to said grid structure through said suspension arm, and a controller adapted to be actuated by said torsional tube assembly and adapted to actuate said control valve in accordance therewith.

17. An apparatus according to claim 16 wherein said torsional tube assembly comprises a hollow torsional tube, and an inner transmission shaft, said hollow torsional tube being rigidly fixed at at least one end to prevent rotation thereof, said hollow torsional tube being also rigidly attached to said suspension arm, said inner transmission shaft being rigidly attached to said suspension arm and free to rotate through the same arc as said suspension arm as said grid structure is deflected along a vertical axis in accordance with the height of said solids level.

18. An apparatus for maintaining a constant solids level in a vessel through which said solids are continuously flowing downward in a solid moving bed, which comprises a vertically elongated grid extending through said solids level, supporting means for said grid, said supporting means being adapted to permit said grid to move vertically with a variation in the height of the solids level, and means for transmitting the motion of the grid to the outside of the vessel, said last named means comprising a hollow torsional tube rigidly attached to said vessel at one point and rigidly attached at right angles to said supporting means at a remote point within said vessel, and an inner transmission shaft also rigidly attached to said supporting means at said remote point and extending through the walls of said vessel and free to rotate at a point outside said walls.

19. An apparatus according to claim 18 in which the grid is a vertical cylindrical screen permitting substantially unimpaired flow of solids therethrough.

20. An apparatus according to claim 18 in which the grid is a vertical perforated tube permitting substantially unimpaired flow of solids therethrough.

21. An apparatus according to claim 18 in which the grid comprises a series of horizontal plates connected by tie rods.

22. An apparatus according to claim 11 in which the torsional tube assembly comprises a hollow torsional tube rigidly attached to the walls of said column in the free space thereof and rigidly attached to said suspension arm at a mid-point thereof, and an inner transmission shaft rigidly attached to said suspension arm at said mid-point and free to rotate at one end thereof, and the controller is an air-operated controller which is actuated by the motion of the free end of said transmission shaft.

23. An apparatus according to claim 11 in which means are provided for introducing a sealing gas into the free space at the top of said sealing leg, and a seal gas disengager is provided at the bottom of said sealing leg, said seal gas disengager comprising a funnel open at both ends and adapted to receive solids and sealing gas flowing from said sealing leg and discharge sealing gas upward through the top of the funnel and discharge solids downward into said control valve, a housing surrounding the lower portion of said sealing leg, said funnel, and said control valve, means for withdrawing sealing gas from the upper portion of said housing, and means for withdrawing solids from the lower portion of said housing.

CLYDE H. O. BERG.

REFERENCES CITED

The following references are of record in the file of this patent:

UNITED STATES PATENTS

| Number | Name | Date |
|---|---|---|
| 234,747 | Boynton | Nov. 23, 1880 |
| 510,954 | Beall | Dec. 19, 1893 |
| 1,115,193 | Hay | Oct. 27, 1914 |
| 2,304,827 | Sewell | Dec. 15, 1942 |
| 2,360,787 | Murphee | Oct. 17, 1944 |
| 2,368,672 | McNamara | Feb. 6, 1945 |
| 2,397,566 | Schutte | Apr. 2, 1946 |

FOREIGN PATENTS

| Number | Country | Date |
|---|---|---|
| 618,502 | Germany | Sept. 10, 1935 |